(12) United States Patent
Wedam

(10) Patent No.: US 11,140,884 B2
(45) Date of Patent: Oct. 12, 2021

(54) FISHING LURES

(71) Applicant: BnR Tackle LLC, Hermiston, OR (US)

(72) Inventor: Brandon G. Wedam, North Plains, OR (US)

(73) Assignee: BnR Tackle LLC, Irrigon, OR (US)

( * ) Notice: Subject to any disclaimer, the term of this patent is extended or adjusted under 35 U.S.C. 154(b) by 0 days.

(21) Appl. No.: 16/856,911

(22) Filed: Apr. 23, 2020

(65) Prior Publication Data

US 2020/0245601 A1    Aug. 6, 2020

Related U.S. Application Data

(63) Continuation-in-part of application No. 15/643,913, filed on Jul. 7, 2017, now abandoned, which is a continuation-in-part of application No. 14/791,190, filed on Jul. 2, 2015, now abandoned.

(51) Int. Cl.
*A01K 85/18* (2006.01)
*A01K 91/04* (2006.01)

(52) U.S. Cl.
CPC .............. *A01K 85/18* (2013.01); *A01K 91/04* (2013.01)

(58) Field of Classification Search
CPC ........ A01K 85/00; A01K 85/16; A01K 85/18; A01K 91/03; A01K 91/04
See application file for complete search history.

(56) References Cited

U.S. PATENT DOCUMENTS

| | | | |
|---|---|---|---|
| 148,926 A | 3/1874 | Cahoon | |
| 2,529,179 A * | 11/1950 | Oberholtzer | A01K 93/00 43/44.91 |
| 2,556,932 A * | 6/1951 | Morrissey | A01K 93/00 43/44.91 |
| 3,210,883 A | 10/1965 | Ulsh | |
| 3,579,892 A | 5/1971 | Olvey, Sr. | |
| 4,472,903 A * | 9/1984 | Hutson | A01K 95/00 43/44.91 |
| 4,644,681 A * | 2/1987 | Hutson | A01K 93/00 43/44.91 |
| 5,197,220 A * | 3/1993 | Gibbs | A01K 85/16 43/42.09 |
| 5,245,781 A | 9/1993 | Helmuth | |
| 5,595,015 A | 1/1997 | Jensen | |

(Continued)

OTHER PUBLICATIONS

"Hardness Shore D", 2015, archived May 24, 2015, Special Chem .com, <https://omnexus.specialchem.com/polymer-properties/properties/hardness-shore-d> (Year: 2015).

*Primary Examiner* — Michael H Wang
(74) *Attorney, Agent, or Firm* — Lane Powell PC

(57) ABSTRACT

The disclosed fishing lure systems have a fishing lure, bead sleeve, and a stop that can be used in combination with a fishing line and hook. The fishing lure has a pliable body and a pre-formed hole. The bead sleeve can be fitted within the pre-formed hole with an interference fit because the pliable body expands to fit around the bead sleeve to hold it in place within the pre-formed hole. The stop is positioned on one side of the fishing lure and bead sleeve to prevent it from sliding down towards the hook or possibly over some portion of the hook. The stop can be positioned spaced apart from the hook on a fishing line so that the distance between the fishing lure and the hook remains at a desirable spacing while in use.

19 Claims, 9 Drawing Sheets

(56) References Cited

U.S. PATENT DOCUMENTS

| | | | | |
|---|---|---|---|---|
| 6,327,808 B1* | 12/2001 | Zascavage | ............ | A01K 85/00 |
| | | | | 43/42 |
| 6,898,894 B1* | 5/2005 | Anderson | ............... | A01K 85/00 |
| | | | | 43/42.39 |
| 9,010,016 B2* | 4/2015 | Cowin | ................... | A01K 93/02 |
| | | | | 43/44.91 |
| 9,591,841 B2* | 3/2017 | Schoenike | ............. | A01K 91/16 |
| 10,264,775 B2* | 4/2019 | Brown, Sr. | ............ | A01K 95/02 |
| 2012/0079757 A1 | 4/2012 | Rye et al. | | |
| 2013/0180160 A1* | 7/2013 | Petherick | ............... | A01K 91/04 |
| | | | | 43/43.1 |
| 2014/0237891 A1 | 8/2014 | Donahoe | | |
| 2015/0013211 A1 | 1/2015 | Schoenike | | |
| 2015/0272095 A1* | 10/2015 | Furuya | ................... | A01K 85/00 |
| | | | | 43/44.81 |

\* cited by examiner

FISHING LURES

CROSS-REFERENCE TO RELATED APPLICATIONS

This application is a Continuation-in-Part of U.S. application Ser. No. 15/643,913, entitled "Fishing Lures," filed Jul. 7, 2017, which is a Continuation-in-Part of U.S. Non-Provisional application Ser. No. 14/791,190, entitled, "Soft Fishing Bead," filed Jul. 2, 2015 (now abandoned), which is incorporated herein by reference in its entirety for all purposes.

BACKGROUND

Most anglers are passionate about fish and the equipment they use to catch them. Some anglers even refer to fishing as a religion or an addiction and take great care preparing their equipment to maximize the experience and pleasure of catching fish. Anglers tend to use a variety of lures, including a combination of live bait and artificial lures. Artificial lures provide anglers with a wide variety of options to entice fish to bite. Steelhead and salmon anglers, for example, may use artificial lures that resemble common food sources for the fish they wish to catch. Many salmon, steelhead, and trout anglers are interested in a fishing technique called bead-fishing in which the artificial lure emulates a fish egg, which is a nutrient-rich food source. Conventional artificial lures specific to bead-fishing use hard, dense materials or solid soft materials that either sink in the water or are difficult to thread onto a fishing line, respectively, especially in unfavorable weather or lighting conditions that often happen on a fishing trip.

Anglers that use bead-fishing techniques usually want the artificial lure to be placed a particular distance away from the fishing hook to minimize the risk that a hooked fish will suffer a fatal injury when hooked and can safely be returned to their habitat after being caught. Conventional bead-fishing requires significant time and resources to thread beads onto the fishing line, either because they are rigid and require attention at each use or because they are a solid soft material and require that the angler pierce the solid bead with the hook and awkwardly thread the bead onto the line securing it in place with a bead stop that still often migrates along the line during use.

The art would benefit from a new fishing system with a lure that is easily and efficiently attached to a fishing line and hook and that can be reusable and help minimize injury to the hooked fish.

SUMMARY

An example of the disclosed fishing lure systems include a fishing lure, a bead sleeve, and a stop. The fishing lure has a pliable body and a pre-formed hole having a hole diameter. The pre-formed hole extends through a central portion of the body and has a hole length with a first line end and a second, opposing hook end. The bead sleeve has a sleeve diameter and a sleeve length with a line end and an opposing hook end. The sleeve diameter is greater than the hole diameter and is sized to provide an interference fit between the fishing lure and the bead sleeve when the bead sleeve is inserted into the pre-formed hole. The stop has a stop diameter larger than the sleeve diameter and is positioned on the hook end of the bead sleeve.

Another example fishing lure system has a fishing lure, a bead sleeve, a stop, a fishing line, and a hook. The fishing lure has a pliable body and a pre-formed hole with a hole diameter. The bead sleeve has a sleeve diameter and a sleeve length. The sleeve diameter is greater than the hole diameter. The bead sleeve is fitted into the hole of the fishing lure to provide an interference fit between the fishing lure and the bead sleeve. The stop has a stop hole with a stop diameter that is larger than the sleeve diameter. The fishing line is positioned to extend through the bead sleeve and the stop hole. The hook has an attachment element that is structured to be secured to an end of the fishing line opposite from the fishing lure.

DETAILED DESCRIPTION

Many anglers enjoy using a bead-fishing technique to catch fish, especially when intending to catch-and-release the fish, to avoid damage to vital organs in the fish. Bead-fishing intends to maximize the likelihood that the hook will pierce the fish on the outside or near the outside of the fish's mouth. Beads can be any shape and often emulate natural food sources of the desired catch, which can be fish eggs in some species that are generally spherical. Most of the currently available fishing beads are made of a hard or rigid material and are dense which cause them to quickly sink in the water during use. Natural eggs are a pliable, biological material and do not instantly sink in the water. So while bead-fishing has grown in popularity, the conventional designs have many drawbacks.

Figure 1:
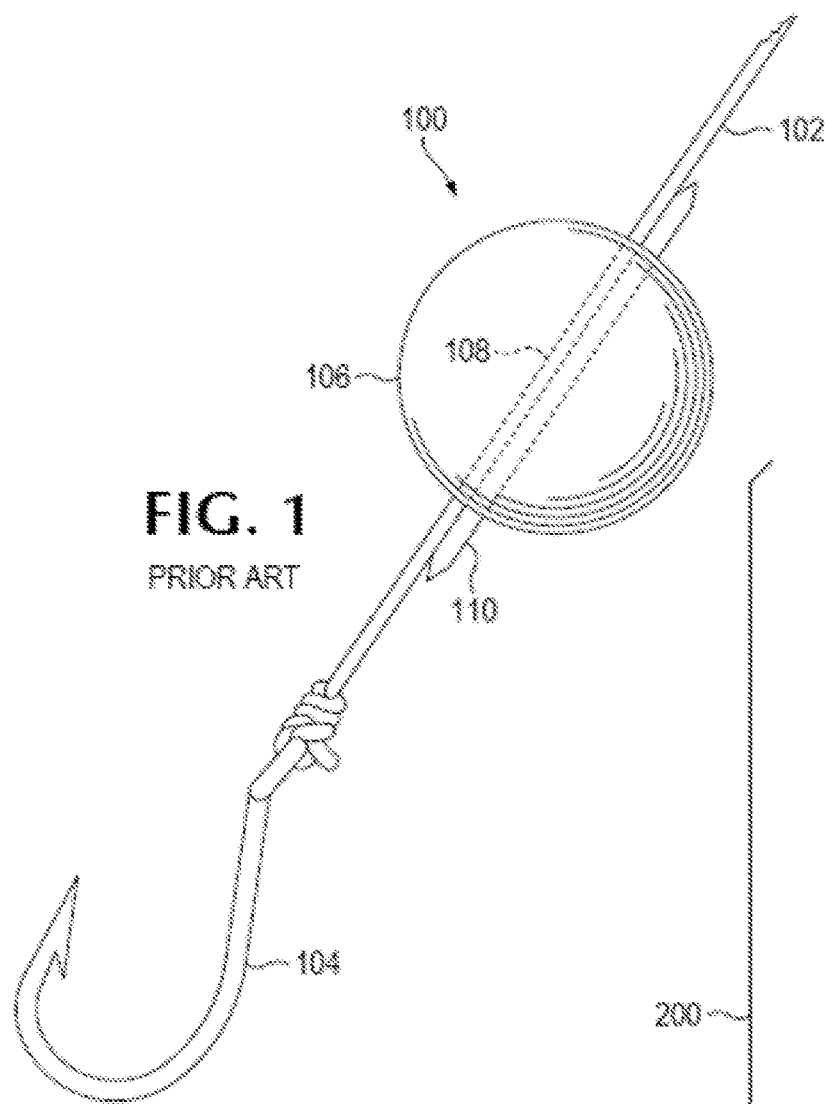
FIG. 1 shows a prior art hard bead and rigid stopper fishing system.

FIG. 1 shows an example prior art fishing bead system 100 fitted onto a fishing line 102 with a hook 104 attached to one end. The prior art fishing system 100 has a hard bead 106 with a spherical shape and is made of an inelastic, dense material like glass or ceramic. Anglers like to paint or otherwise decorate the exterior surface of the hard beads to more closely emulate food sources or to otherwise attract the fish so the conventional beads used for bead-fishing are hard to accommodate the paint and/or other decorations. The hard bead 106 shown in FIG. 1 has a pre-formed hole 108 through its center to allow the fishing line 102 to be threaded through it. The pre-formed hole 108 of the hard bead 106 freely slides along fishing line 102 because the pre-formed hole 108 has a greater diameter than the fishing line 102. Ideally, anglers like to position the hard bead 106 a certain distance away from the hook 104 so that it does not slide down towards the hook 104 and become lodged in the fish's mouth when a fish is hooked. Because the pre-formed hole 108 of the hard bead 106 is inelastic, anglers like to place a rigid stop 110 into the pre-formed hole 108 of the hard bead 106, like a stick, such as the broken-off toothpick shown in FIG. 1 to secure the hard bead 106 in place. Anglers also use semi-rigid or semi-flexible stops like a portion of a rubber band or other mechanism that can be fitted into the inelastic pre-formed hole 108 of the hard bead 106 and pressed against the fishing line 102. Unfortunately, the rigid or semi-rigid/flexible stop and hard bead combination still slides along the fishing line during use, especially when the angler is casting or if a fish is hooked and is thrashing its head in many directions.

Other, less conventionally used fishing beads can be made of a pliable material; however, they are completely solid with no hole and present different setbacks. Anglers using such solid soft beads are required to use a free-hand technique to pierce the soft bead with the hook and fit the hook through the soft bead to slide it on to the fishing line. Once fitted over the fishing line, these soft beads slide along the line and also require a stop to secure it in place. Similar to the hard beads, anglers using solid soft beads often insert a rigid, semi-rigid/flexible stop into the newly-created hole to attempt to secure the soft bead against the fishing line. However, the newly-created hole often has a rough interior surface and an irregular shape due to its piercing by the fishing hook. Similar to the hard bead design, the solid soft bead and stop combination also migrates along the fishing line during use, especially when casting and when a fish is hooked and thrashing its head.

Figure 2:
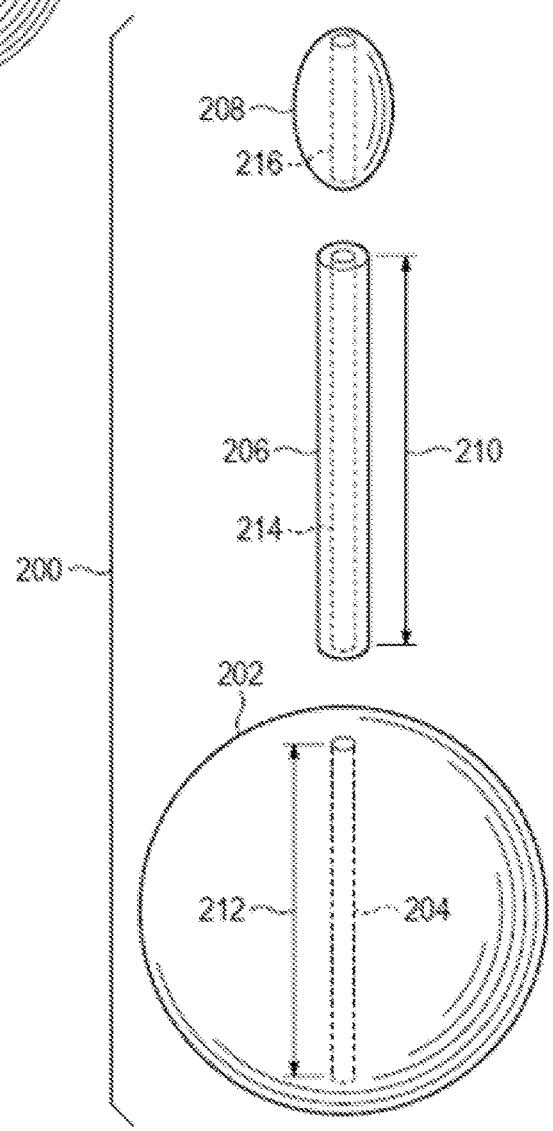
FIG. 2 shows an exploded view of an example fishing system, according to the disclosure.

The disclosed systems, methods, and lures have several advantages over the prior art hard bead or solid soft bead designs. FIG. 2 shows an example fishing lure system 200 with a pliable bead 202 having a pre-formed hole 204 through its length, a bead sleeve 206, and a stop 208. The bead 202 in this example is spherical, to emulate a fish egg, although it can be any suitable shape such as another fish food source like a worm, grub, lizard, frog, crayfish, fish, and the like. The size of the bead 202 can vary as well and may align with different phases of a fish egg diameter as it would normally naturally grow in size. For example, the bead size can be 6 millimeters (mm), 8 mm, 10 mm, 12 mm, 14 mm, 16 mm, or larger if desired. The diameter of the soft bead selected by the angler can be dependent on the water visibility in which the target fish resides or other environmental conditions. In some cases, multiple soft beads can be used together in a single fishing system and are fitted adjacent each on the same bead sleeve. The soft beads can be a variety of colors, textures, and patterns or other decorative feature(s).

FIG. 2 shows an exploded view of an example soft bead 202, bead sleeve 206, and stop 208. The bead sleeve 206 can be fitted into the flexible pre-formed hole 204 of the soft bead 202. The soft bead 202 is pliable and can be stretched or extended to fit around the more rigid bead sleeve 206. The elasticity of the soft bead 202 creates an interference fit between the bead sleeve and the interior surface of the pre-formed hole 204 of the soft bead 202 when the sleeve is inserted within it. The bead sleeve 206 has a diameter that is larger than the diameter of the pre-formed hole 204 of the soft bead 202 so that the soft bead has to be flexed and expanded to fit around the bead sleeve 206 for the sleeve 206 to be inserted within it. The bead sleeve 206 is also preferably made of a material that is more rigid that the material of the soft bead 202. In some examples, the bead sleeve is made of a semi-rigid material, such as acrylonitrile-butadiene-styrene (ABS). The soft bead 202 can be a pliable thermoplastic. In some examples, the pliable thermoplastic is selected with a shore durometer in a range of typical food sources, such as fish eggs. The shore durometer of the material for the bead sleeve can be more rigid or harder than the soft bead, such as a shore durometer in the range of 00 to 100. Other shore durometers can be used for both the soft bead and the bead sleeve, as needed. In some examples, the shore durometer is selected based on the environmental conditions, such as the type of fish being targeted and the cover or other objects likely to be present in the water, such as weeds, lily pads, wood or logs, other fish, rocks, and the like.

The bead sleeve 206 shown in FIG. 2 is a tube shape that mates with the interior shape of the cylindrical pre-formed hole 204 in the soft bead 202. Alternatively, the bead sleeve can have an exterior surface contour that is different than a mate to the interior of the pre-formed hole and could include ridges, textures, coatings, protrusions, or the like that interface with the interior surface of the pre-formed hole. Some example soft beads are created through a heated injection molding process and additives such as color, texture, scents, and other components can be added to the heated thermoplastic during the molding process. Methods of manufacturing the soft beads are discussed in more detail below.

The material selected for the soft beads can have a positive buoyancy, negative buoyancy or a neutral buoyancy characteristic when emerged in water. The average density of the soft bead can be adjusted to be approximately equal to, for neutral buoyancy; or less than, for positive buoyancy, the water based on the type of fishing for which the soft bead is intended. For example, the buoyancy characteristics of the soft bead material could be selected based on the type of fish food that the soft beads try to emulate so that they appear as close to live bait as possible. Still further, the soft bead material can be selected based on its elasticity to withstand the frictional forces applied to the soft bead, such as during trolling or when the fish is thrashing its head, and can also be selected based on its relation to the material selected for the bead sleeve.

The bead sleeve 206 shown in FIG. 2 has a sleeve length 210 that is greater than a length 212 of the pre-formed hole 204 in the soft bead. In the example shown in FIG. 2, the sleeve length 210 is slightly greater than the pre-formed hole length 212. The bead sleeve 206 can accommodate a single bead, the soft bead 202 shown in FIG. 2. Alternative examples have a bead sleeve 206 that is longer than the one shown in FIG. 2 and some of them can accommodate multiple soft beads on a single bead sleeve. One example system has a bead sleeve that is greater than the pre-formed hole length but is less than two times the pre-formed hole length. Other example systems have bead sleeves that exceed two times the pre-formed hole length. The bead sleeve length can be any desired length chosen by the angler.

In the example shown in FIG. 2, the bead sleeve 202 is a tube with a hollow interior 214. Other example bead sleeves can be different shapes and/or can have contours, textures, protrusions, or the like on their exterior surfaces. The interior, hollow surface 214 of the bead sleeve 206 can be smooth, such as the example shown in FIG. 2, or could alternatively be coated or otherwise shaped to help the fishing line interact with the bead sleeve as effectively as possible. For example, the interior, hollow surface of the bead sleeve can be coated with a lubricant to help reduce friction between the fishing line and the bead sleeve so the sleeve slides along the line or with a scent to attract the fish to the fishing lure system.

The fishing lure system 200 of FIG. 2 also includes a bead stop 208. The bead stop 208 has a pre-formed hole 216 formed through it. Bead stops can be any suitable shape although the stop 208 shown in FIG. 2 is an oval-shape. The diameter the stop 208 is greater than the diameter of the hollow interior 214 of the bead sleeve 206 which prevents the bead sleeve 214 from sliding past the stop 208 along the fishing line during use. The bead stop hole 216 has a diameter that is only slightly larger than the diameter of the fishing line to secure the bead stop on the fishing line by an interference fit or the bead stop hole 216 can have a diameter that is larger than the diameter of the fishing line and the angler ties a knot in the line between the stop 208 and the hook to prevent the stop from moving along the fishing line past the knot. In the disclosed systems, anglers place the bead stop 208 at the desired distance spaced apart from the fishing hook. Placement of the bead stop 208 then guides where the bead sleeve 206 can be positioned because the bead sleeve 206 cannot move past the stop 208 when the sleeve hollow, interior 214 is smaller than the diameter of the stop 208.

Figure 3:
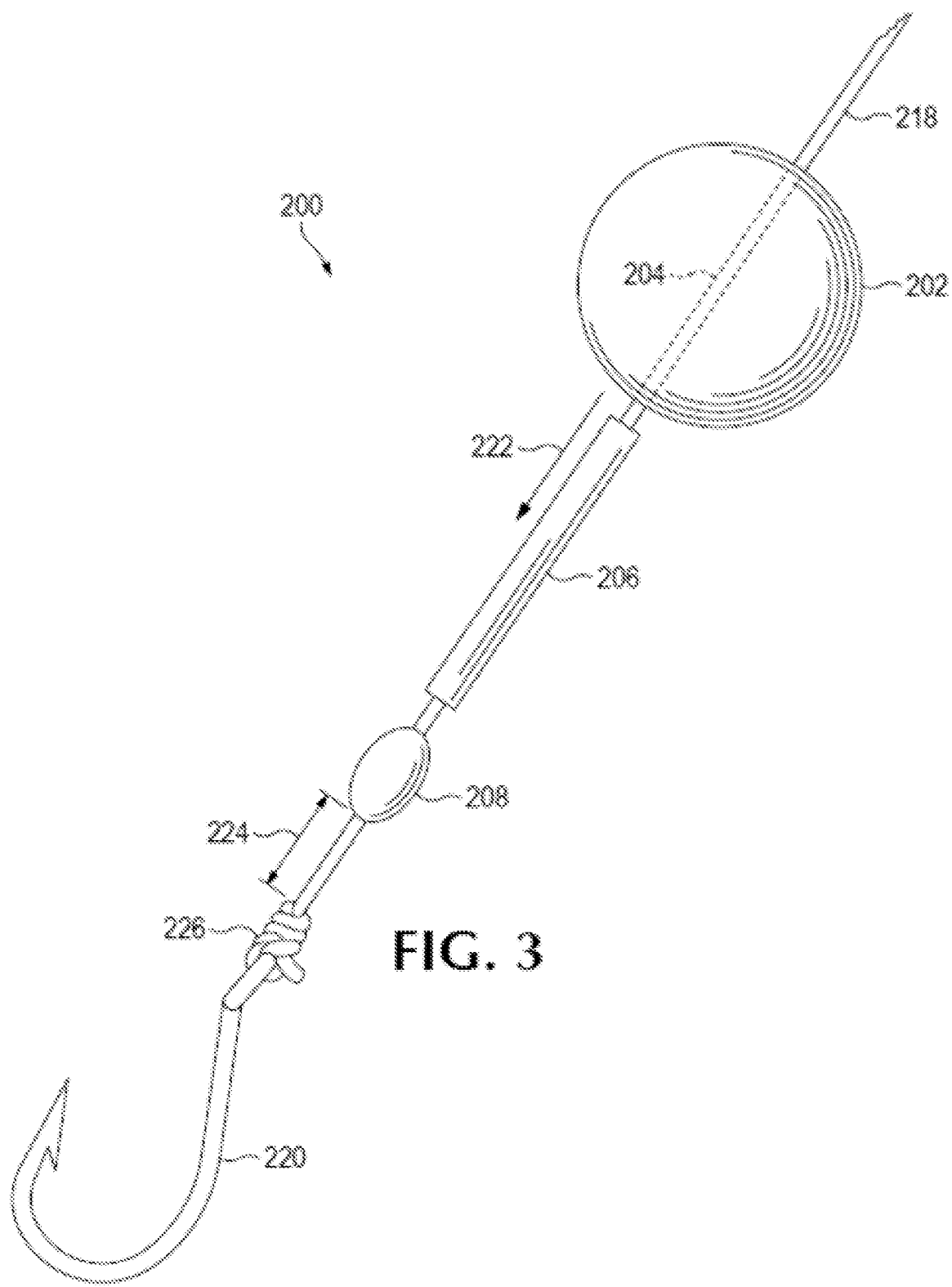
FIG. 3 shows the example fishing system of FIG. 2 positioned on a fishing line with a hook.

FIG. 3 shows the fishing lure system 200 of FIG. 2 on a fishing line 218 with an attached hook 220. The fishing line 218 is fed through the pre-formed hole 204 of the soft bead 202, the hollow, interior 214 of the bead sleeve 206, and the hole 216 of the stop 208. The arrow 222 indicates that the soft bead 202 is slid over the bead sleeve 206 so that the exterior surface of the bead sleeve 206 is in contact with and creates an interference fit with the interior surface of the pre-formed hole 204 of the soft bead 202. The bead stop 208 is positioned a distance 224 spaced apart from the hook 220 and is secured in place either by its own interference fit with the fishing line or by the knot 226 or other securing element that secures the hook 220 to the fishing line 218.

Figure 4:
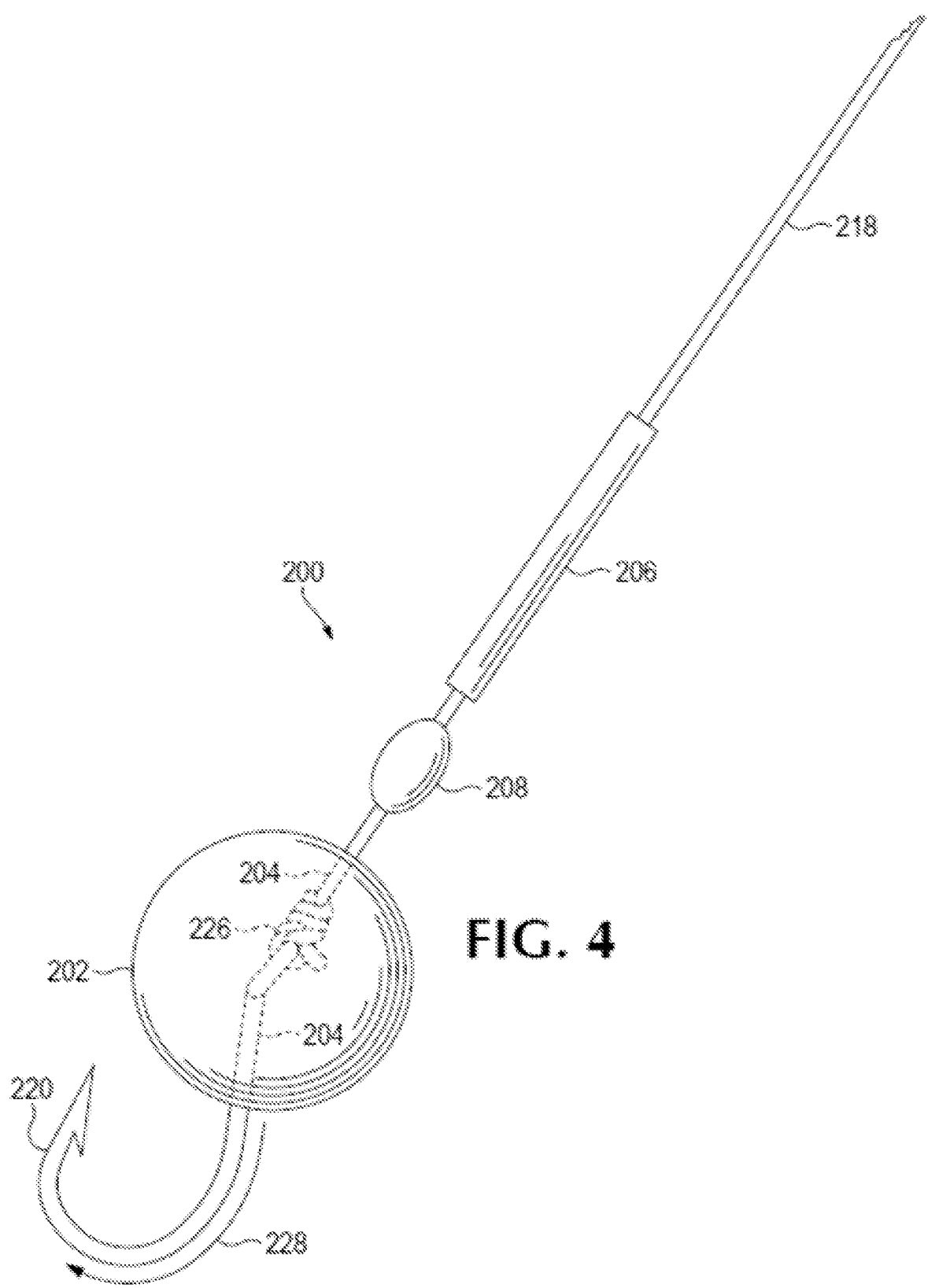
FIG. 4 shows an example of removing the fishing lure of the example fishing lure system shown in FIG. 2.
Figure 5:
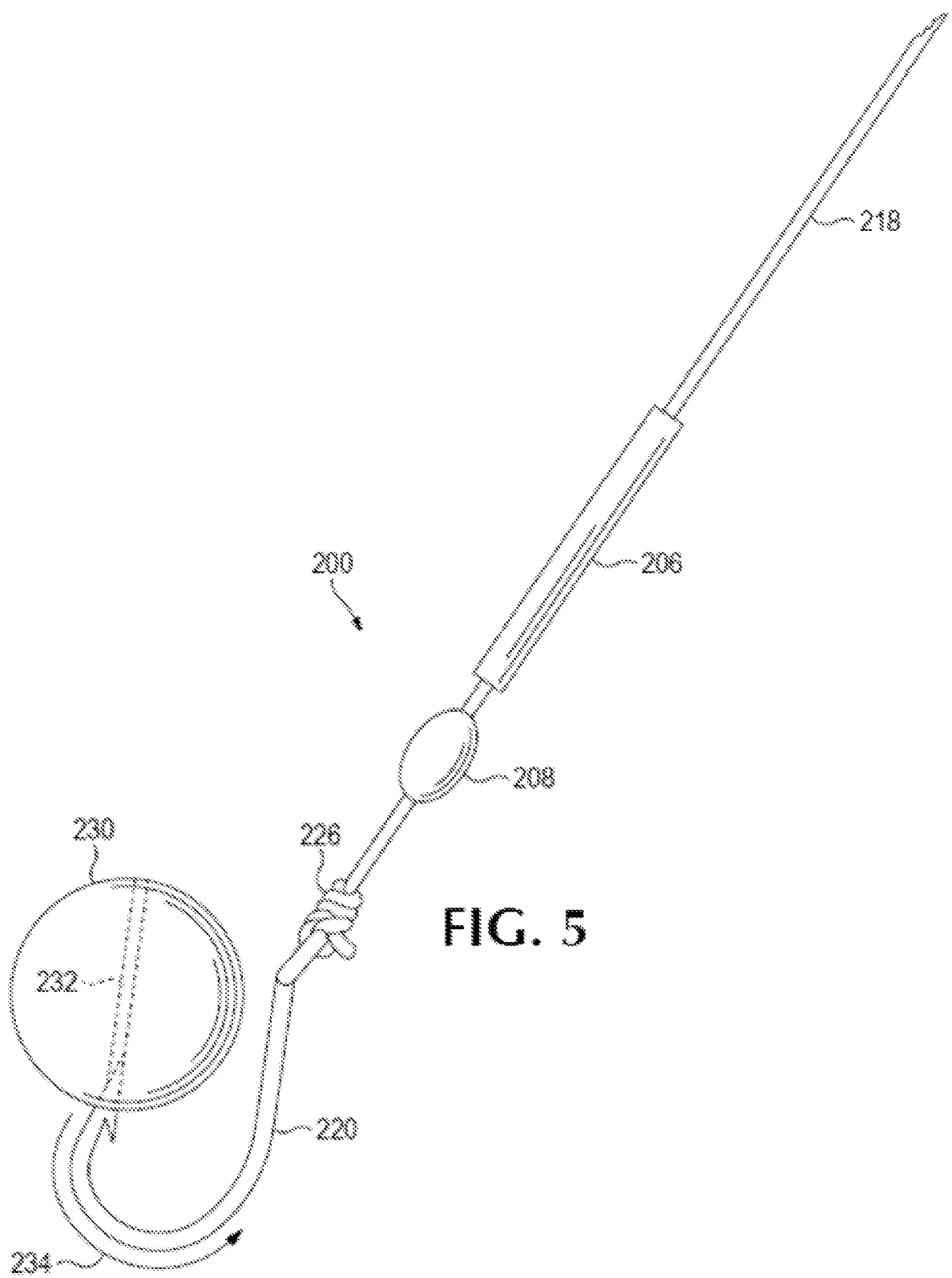
FIG. 5 shows an example of placing a new fishing lure onto the lure system of FIG. 2.

FIGS. 4 and 5 show the fishing lure system 200 from FIG. 2 as the soft bead 202 is removed from the fishing lure system 200. Because the soft bead is pliable, it can expand to be slid over the bead stop 208, the knot 226, and the hook to be removed from the system 200, as shown in FIG. 4 by arrow 228. As the soft bead 202 is being removed, the pliability of its material allows for the pre-formed hole 204 to flex and expand, as needed. FIG. 4 shows the pre-formed hole 204 in a flexed and expanded position to accommodate the knot 226 and a portion of the hook 220. FIG. 5 shows a new soft bead 230 being slid onto the fishing lure system 200. The new soft bead 230 is a different sized sphere than the original soft bead 202. In other examples, the new soft bead 230 can be the same sized sphere and can have a different shape, color, contour, texture, or any other different characteristic than the original soft bead 202. Similar to the original soft bead 202, new soft bead 230 and its pre-formed hole 232 are pliable. The pre-formed hole 232 flexes and expands to be slid over the hook and into the fishing lure system 200, as shown by arrow 234 in FIG. 5. The pre-formed hole 232 of the new soft bead 230 also flexes and expands to be slid over the stop 208 and the bead sleeve 206 in a similar fashion to the original soft bead 202.

Figure 6:
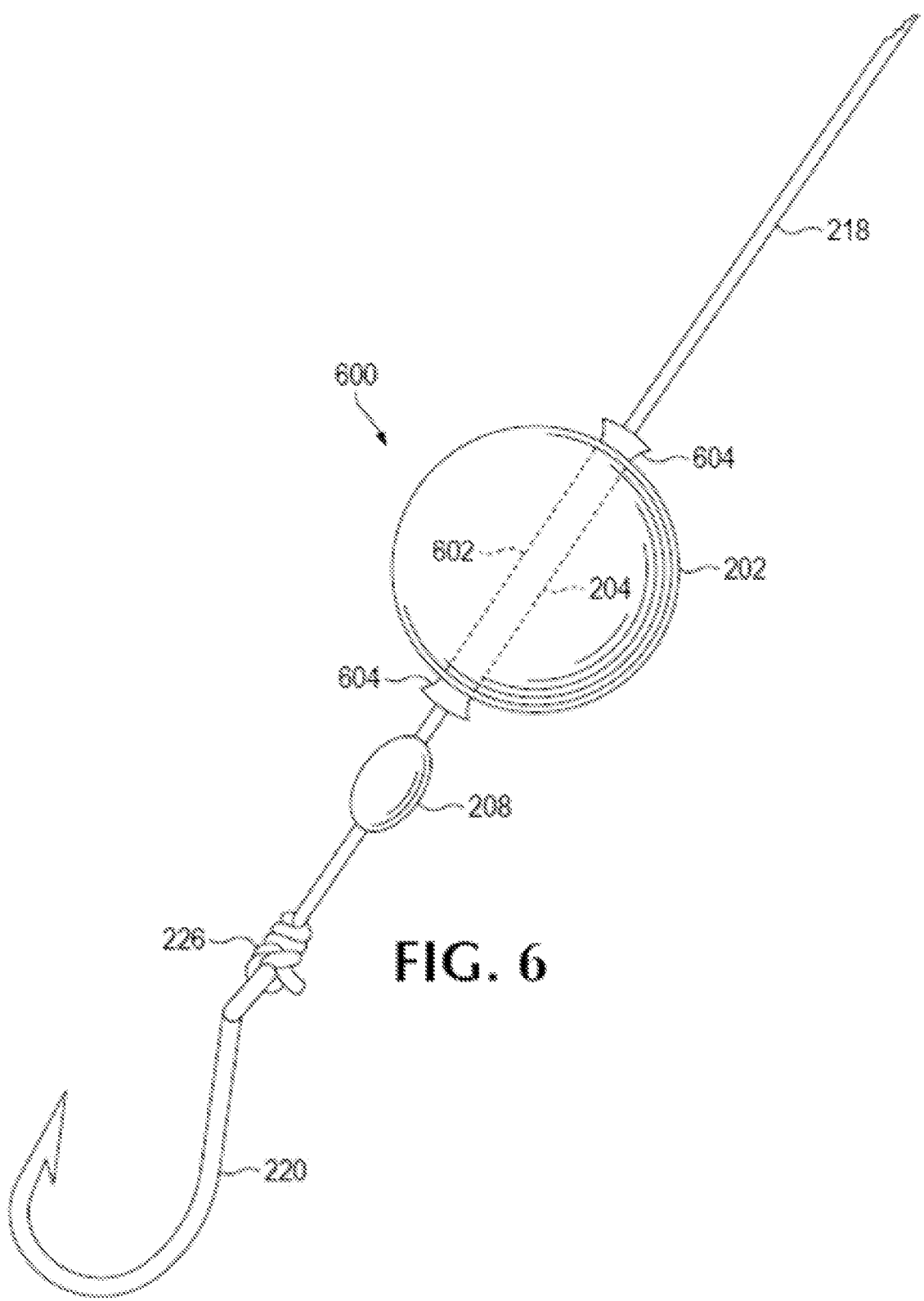
FIG. 6 shows an alternative example fishing system in accordance with the disclosure.

FIG. 6 shows another embodiment 600 of the disclosed fishing lure systems. The system 600 has the same elements as the embodiment shown in FIG. 2 including the soft bead 202 and a bead stop 204, but has a different bead sleeve 602. The bead sleeve 602 shown in FIG. 6 is a tube shape, like the sleeve 206 from FIG. 2, but also has radially extending protrusions 604 on each end. The radially extending protrusions 604 provide additional stops to prevent the soft bead 202 from sliding off of the bead sleeve 602 during use, such as when the fish is thrashing its head when it is hooked. Other embodiments have a bead sleeve with a radially extending protrusion on only one end of the bead sleeve or other types of protrusions on one or both ends of the bead sleeve.

Figure 7:
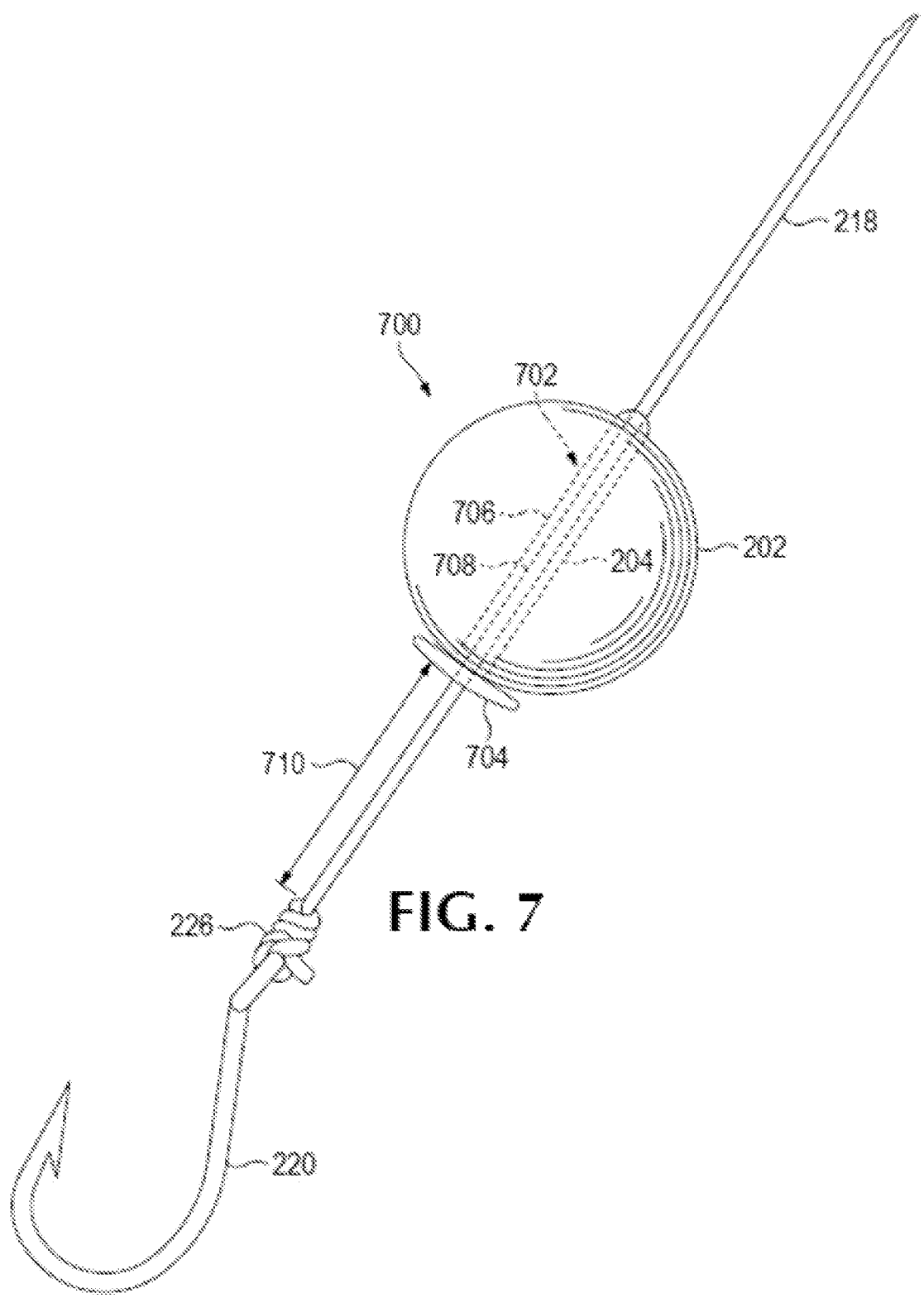
FIG. 7 shows another example fishing system according to the disclosure.

FIG. 7 shows another embodiment of a fishing lure system 700 with a soft bead 202. The bead sleeve 702 in this example has a saucer-shaped end 704 and a post 706 with a pre-formed hole 708 extending through it. The saucer-shaped end 704 is shaped to mate with the shape of an exterior surface of the soft bead 202 a distance 710 spaced apart from the fishing hook 220. The post 706 extends through the length of the pre-formed hole 204 of the soft bead 202 although it can be longer or shorter in other examples. The saucer-shaped end 704 of the bead sleeve 702 can form an interference fit with the fishing line 218 to secure the fishing lure system 700 in place on the fishing line 218 or anglers can optionally create a knot spaced apart from the fishing hook 220 and the knot 226 where the hook 220 attaches to the fishing line 218 to further secure the bead sleeve 702 in place.

Figure 8A:
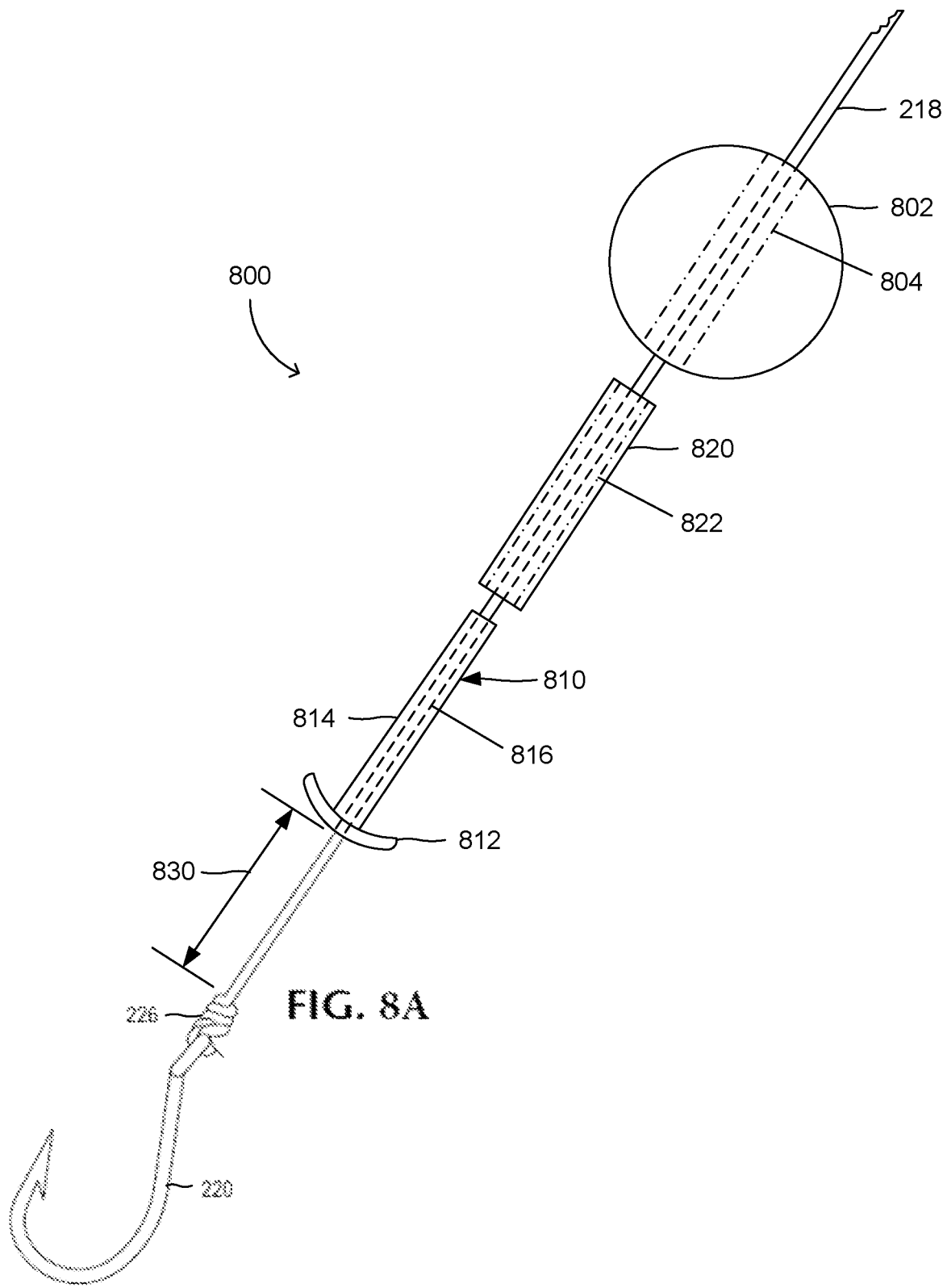
FIGS. 8A-8B show another example fishing system according to the disclosure.
Figure 8B:
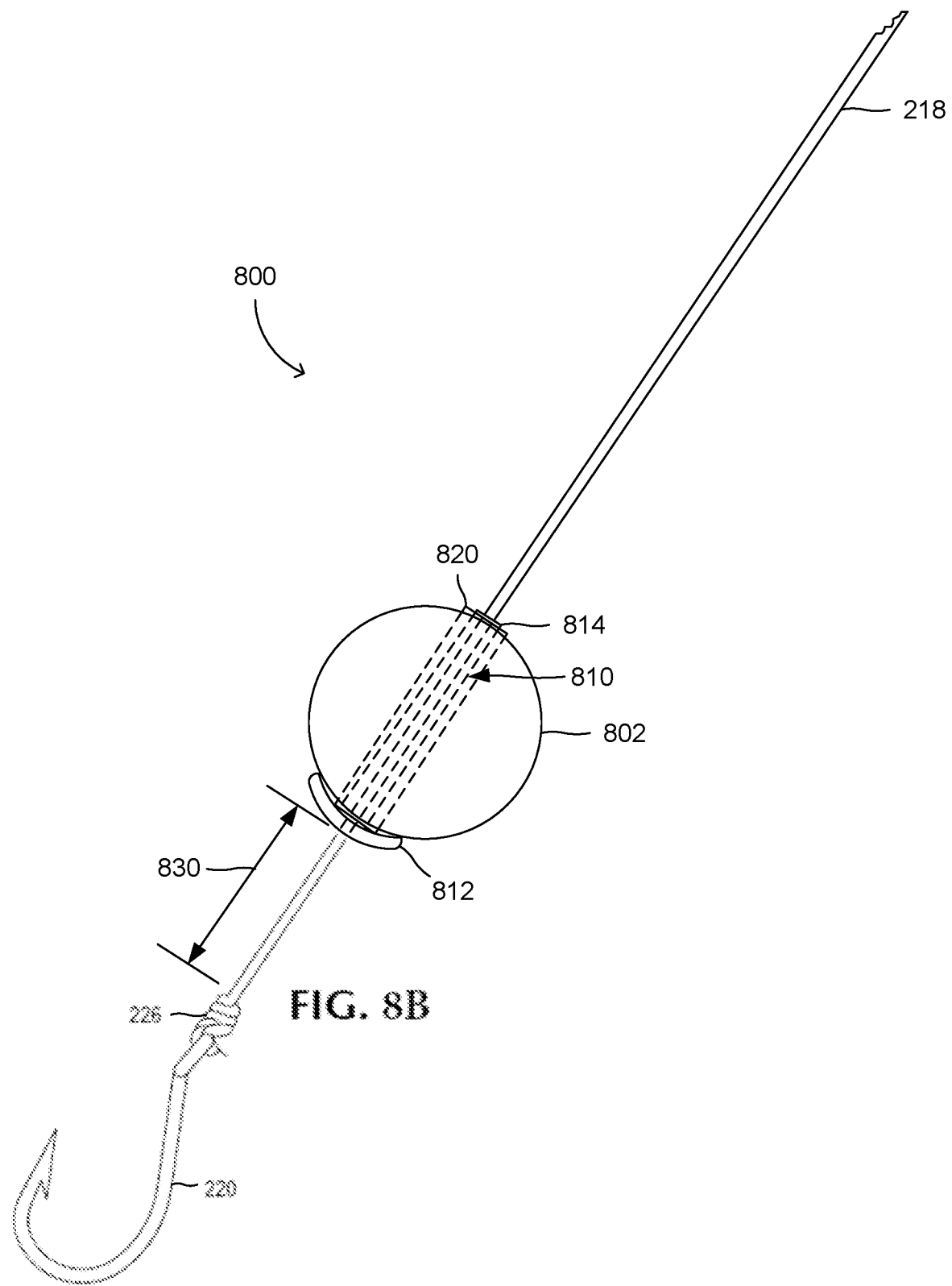

FIG. 8A shows an exploded view of a fishing lure system including a soft bead 802 and a bead stop 810 on the fishing line 218 with the hook 220 secured thereto by the knot 226. FIG. 8B shows a fully assembled view of the fishing lure system. In one example, the bead 802 and the bead stop 810 are coaxial (i.e., the bead 802 and the bead stop 810 share a common axis). The fishing line 218 includes a hook end to which the hook 220 can be or is attached, and a pole end that is attached to or near or proximal to a fishing pole or rod.

The soft bead 802 can be a pliable thermoplastic. In some examples, the pliable thermoplastic is selected with a shore durometer in a range of typical food sources, such as fish eggs. The shore durometer of the material for the bead sleeve can be more rigid or harder than the soft bead, such as a shore durometer in the range of 00 to 100. Other shore durometers can be used for both the soft bead and the bead sleeve, as needed. In some examples, the shore durometer is selected based on the environmental conditions, such as the type of fish being targeted and the cover or other objects likely to be present in the water, such as weeds, lily pads, wood or logs, other fish, rocks, and the like.

The bead stop 810 has a flared end 812 and a post 814. The bead stop 812 includes a pre-formed hole 816 extending through it. The flared end 812 faces the hook end of the fishing line 218 with the post 814 extending outwardly from the flared end 812 toward the pole end of the fishing line 218. The pre-formed hole 816 is sized (e.g., the hole 816 has a diameter smaller than the diameter of the fishing line 218) such that the bead stop 812 forms a friction fit or an interference fit with the fishing line 218. The friction or interference fit secures the bead stop 812 in place on the fishing line 218 a set distance 830 from the hook 220. The bead stop 810 prevents the bead 802 from getting closer to the hook 220 than the set distance 830. This can, for example, permit the bead 802 to slide and move freely along the fishing line 218 to imitate a fish egg or live bait. The set distance 830 can be at least 1 millimeter, can be up to and including 305 millimeters.

In one example, the length of the post 814 is equal to the length of the pre-formed hole 804. In another example, the length of the post 814 is less than the length of the pre-formed hole 804. In another example, the length of the post 814 is greater than the length of the pre-formed hole 804.

The diameter of the post 814 is greater than the diameter of the pre-formed hole 804. Alternatively, in one example, the diameter of the post 814 is equal to the diameter of the pre-formed hole 804. Alternatively, in another example, the diameter of the post 814 is less than the diameter of the pre-formed hole 804.

In one example, the post 814 is sized to increase friction between the bead stop 810 and the bead 802 or the bead sleeve 820. The increased friction reduces or inhibits movement of the bead 802 relative to the bead stop 810, whether with or without the bead sleeve 820.

In one example, the bead stop 810 is composed of a thermoplastic to allow for a tighter or more secure interference or friction fit between the bead stop 810 and the fishing line 218, such as when the bead stop 810 is exposed to one or more temperatures. The thermoplastic, by reacting to the air or water temperature, can provide the tighter or more secure interference or friction fit between the bead stop 812 and the fishing line 218. For example, when fishing in water that has a temperature less than or equal to 55° F., the interference fit between the bead stop 810 and the fishing line 218 is tighter and more secure than when the water temperature is greater than 55° F.

In one example, the flared end 812 is shaped to mate with the shape of an exterior surface of the soft bead 802 (e.g., the flared end 812 is saucer-shaped). In another example, the flared end 812 is a disc (e.g., flat or convex).

A color of the bead stop 810 can be selected based on one or more factors, including, without limitation, visibility to fish, matching bead color, fish enticement, the like, or combinations or multiples thereof. For example, the bead stop 812 can be clear to reduce visibility of the bead stop 812 by the fish. As another example, the bead stop 812 can be red to match a red or red-eye bead, which can be used to mimic an egg that a fish would eat. As yet another example, the bead stop 812 (and the bead 802, where it is desirous to do so) can be green to attract a fish.

The bead stop 810 can be translucent, transparent, opaque, or combinations or multiples thereof (i.e., one portion can be translucent and another portion can be opaque, or alternating portions can be transparent and opaque). For example, to make the bead stop 810 translucent, the material of the bead stop 810 can be selected to match the refractive index of the medium (e.g., water) in which the bead stop 810 will be used.

The fishing lure system can also include a bead sleeve 820. In one example, the bead sleeve 820 is a tube with a hollow interior 822. The hollow interior 822 has a greater diameter than the diameter of the fishing line 218, such that the bead sleeve 820 slides freely along the fishing line 218. Other example bead sleeves can be different shapes. The bead sleeve 820 can include one or more contours, textures, protrusions, or the like on their exterior surfaces. The interior, hollow surface 822 of the bead sleeve 820 can be smooth or could alternatively be coated or otherwise shaped to help the fishing line interact with the bead sleeve as effectively as possible. For example, the interior, hollow surface of the bead sleeve can be coated with a lubricant to help reduce friction between the fishing line 218 and the bead sleeve 820 so the bead sleeve 820 slides along the fishing line 218 or with a scent to attract the fish to the fishing lure system. The bead sleeve 820 can be fitted into the flexible pre-formed hole 804 of the soft bead 802. The soft bead 802 is pliable and can be stretched or extended to fit around the more rigid bead sleeve 820. The elasticity of the soft bead 802 creates an interference fit between the bead sleeve 820 and the interior surface of the pre-formed hole 804 of the soft bead 802 when the sleeve is inserted within it. The pre-formed hole 804 of the bead 802 has a diameter greater than a diameter of the fishing line 102, such that the bead 802 slides freely along the fishing line 218.

The bead sleeve 820 has a diameter that is larger than the diameter of the pre-formed hole 804 of the soft bead 802 so that the pre-formed hole 804 expands to a second diameter to fit around the bead sleeve 820 for the sleeve 820 to be inserted within it. The bead sleeve 820 is also preferably made of a material that is more rigid that the material of the soft bead 802. In some examples, the bead sleeve 820 is made of a semi-rigid material, such as acrylonitrile-butadiene-styrene (ABS).

The bead sleeve 820 has a sleeve length that is greater than a length of the pre-formed hole 804 in bead 802. In one example, the sleeve length is greater than the pre-formed hole length. The bead sleeve 820 can accommodate a single bead. Alternative examples have a bead sleeve 820 that can accommodate multiple beads on a single bead sleeve. One example system has a bead sleeve that is greater than the pre-formed hole length but is less than two times the pre-formed hole length. Other example systems have bead sleeves that exceed two times the pre-formed hole length. The bead sleeve length can be any desired length chosen by the angler.

Furthermore, the friction or interference fit secures the bead stop 812 in place on the fishing line 218 the set distance 830 from the hook 220. The bead stop 810 prevents the bead sleeve 820 from getting closer to the hook 220 than the set distance 830. This can, for example, permit the bead sleeve 820 to slide and move freely along the fishing line 218 to imitate a fish egg or live bait. The set distance 830 can be at least 1 millimeter, can be up to and including 305 millimeters.

The bead sleeve 820 can have an exterior surface contour that is different than a mate to the interior of the pre-formed hole 804 and could include ridges, textures, coatings, protrusions, or the like that interface with the interior surface of the pre-formed hole.

Some example 802 are created through a heated injection molding process and additives such as color, texture, scents, and other components can be added to the heated thermoplastic during the molding process. Methods of manufacturing the beads 802 are discussed in more detail below.

The hole 804 of the bead 802 can radially expandable from a first diameter to a second diameter when the post 814 or the bead sleeve 820 is inserted into the hole 804 of the bead 802. The hollow interior 822 of the bead sleeve 820 is radially expandable from a first diameter to a second diameter when the post 814 of the bead stop 810 is inserted into the hollow interior 822 of the bead sleeve 820.

The material selected for the soft beads can have a positive buoyancy, negative buoyancy or a neutral buoyancy characteristic when emerged in water. The average density of the soft bead can be adjusted to be approximately equal to, for neutral buoyancy; or less than, for positive buoyancy, the water based on the type of fishing for which the soft bead is intended. For example, the buoyancy characteristics of the soft bead material could be selected based on the type of fish food that the soft beads try to emulate so that they appear as close to live bait as possible. Still further, the soft bead material can be selected based on its elasticity to withstand the frictional forces applied to the soft bead, such as during trolling or when the fish is thrashing its head, and can also be selected based on its relation to the material selected for the bead sleeve.

In one example, the bead 802, the bead sleeve 820, and the bead stop 810 are coaxial (i.e., the bead 802, the bead sleeve 820, and the bead stop 810 share a common axis).

In one example, a diameter of the post 814 is at least twice as large as the diameter of the hole 804. In one example, such as when the bead sleeve 820 is used, the diameter of the flared end 812 is greater than the diameter of the hollow interior 822 of the bead sleeve 820, thereby preventing the bead sleeve 820 from sliding past the stop 810 along the fishing line during use. In one example, a radius of the bead stop 810 is equal to a diameter of the bead 802, wherein the bead 802 is spherical. The post 814 extends through the length of the hollow interior 822 of the bead sleeve 820, although it can be longer or shorter in other examples.

Figure 9:
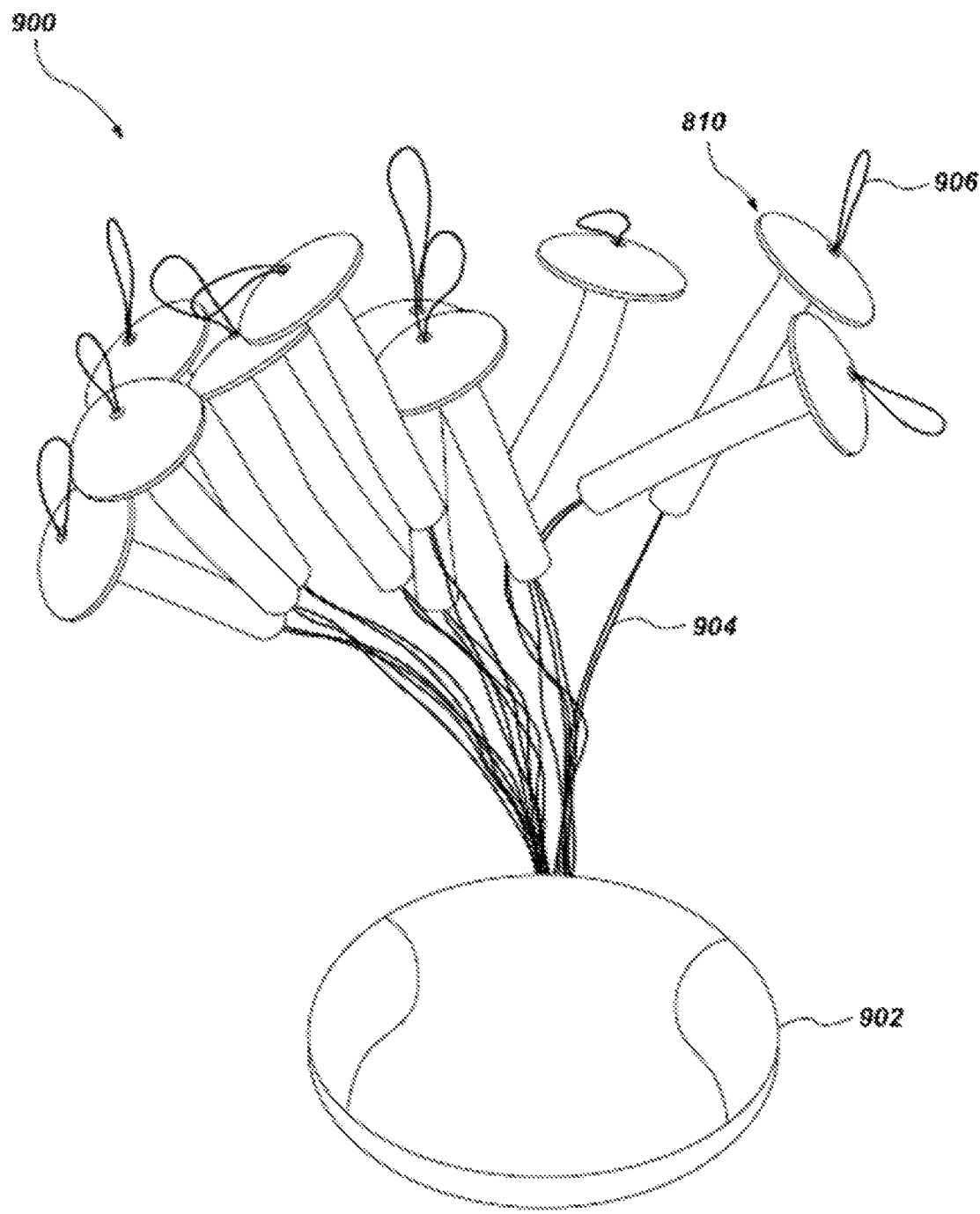
FIG. 9 shows an example loading system.

FIG. 9 shows a loading system 900 to load the bead stop 810 onto the fishing line 218. The bead stop 810 is attached to a base 902 via a linker 904. The linker 904 has a ring end (not shown) and an eyelet 906 at an opposing end of the linker 904. The bead stop 810 can be oriented on the linker 904 based on the desired orientation of the bead stop 810 on the fishing line 218. In one example, such as when the fishing line 218 includes a free end and an end with the hook 220 attached thereto, the flared end 812 of the bead stop 810 is proximal to the base 902 with the shaft 814 extending away from the base 902. In another example, such as when the fishing line 218 an end extending from a rod or reel and an opposing, free end with the hook 220 having been cut or removed therefrom, the flared end 812 of the bead stop 810 is distal to the base 902 with the shaft extending towards the base 902.

The linker 904 can be a string or wire composed of a metal, a polymer, a plastic, a rubber, a cloth, a fabric, the like, or combinations or multiples thereof. The diameter of the linker 904 can be selected such that the diameter of the pre-formed hole 816, when the bead stop 810 is present on the linker 904, is greater than the diameter of the pre-formed hole 816 when nothing is inserted therein or passed through. This allows for the insertion or pass through of one or more components having a diameter greater than the diameter of the pre-formed hole 816 in the non-expanded state (e.g., the fishing line 218). In one example, the diameter of the linker 904 is greater than the diameter of the pre-formed hole 814. In another example, the diameter of the linker 904 is less than the diameter of the pre-formed hole, but large enough so that the eyelet 906, when passing through the pre-formed hole 816 has a diameter greater than the pre-formed hole 816 (i.e., the diameter of the linker 904 is greater than one-half of the diameter of the pre-formed hole 816). Alternatively, the diameter of the linker 904 can be selected such that the diameter of the pre-formed hole 816, when the bead stop 810 is present on the linker 904, is equal to the diameter of the pre-formed hole 816 when the fishing line 218 is inserted therein or passed through.

The base 902 can be a torus, a disc, a cube, a sphere, a cylinder, a cuboid, a triangular prism, a cone, a tetrahedron, or any appropriate shape. The base 902 can be a single piece or multiple pieces (e.g., clamshell, a first and second piece that connect or adjoin, or the like).

In one example, the base 902 can include a keyring to which the linker 904 can be connected. In another example, the linker 904 is attached or connected to the base 902 by an adhesive. In yet another example, the linker 904 is clamped between a first piece and a second piece of the base 902.

In one example, the loading system 900 can include one bead stop 810 connected to the base 902 by the linker 904. In another example, the loading system 900 can include a plurality of bead stops 810, each bead stop 810 being connected to the base 902 by its own linker 904 (i.e., each linker 904 includes one bead stop 810). In yet another example, the loading system 900 can include a plurality of bead stops 810, each linker 904 include two or more bead stops 810. The number of bead stops 910 can be 2, 3, 4, 5, 6, 7, 8, 9, 10, or more than 10.

To load the bead stop 810 onto the fishing line 218, the free end of the fishing line 218 is threaded or inserted through the eyelet 906. The free end of the fishing line 218 is then brought into contact with a segment of the fishing line 218 between the free end and the opposing end, whether connected to a rod or reel or having the hook 220 attached thereto. This forms a fishing line loop. Alternatively, the free end and another segment of the fishing line 218 are pinched together or doubled over. The length of the free end threaded through the eyelet can be any appropriate length. In one example, the smallest length of fishing line 218 threaded through the eyelet 906 is equal to the length of the pre-formed hole 816. In another example, the length of fishing line 218 threaded through the eyelet 906 is less than or equal to 25.4 mm (e.g., 1 inch). In yet example, the length of fishing line 218 threaded through the eyelet 906 is greater than 25.4 mm (e.g., 1 inch).

While maintaining the fishing line loop, the bead stop 810 is slid, whether manually or with a tool, along the linker 904 towards the eyelet 906. The bead stop 810 is then slid over the eyelet 906 and the fishing line loop. The bead stop 810 is further slid until the eyelet 906 exits the shaft 814 of the bead stop 810, such that the bead stop 810 is no longer connected to the base 902 via the linker 904, and is solely on the fishing line 218. The fishing line loop can be protruding from the shaft 814 of the bead stop 810, partially within the pre-formed hole 816 of the bead stop 810, or both.

The bead stop 810 is slid along the fishing line 218 until the free end of the fishing line 218 exits the shaft 814 of the bead stop 810, thereby undoing the fishing line loop. The bead stop 810 can be slid along the fishing line 218 to the set distance 830 or another appropriate distance.

The disclosed fishing lure systems can be packaged together in a kit having one or more soft beads, bead sleeves, and stops. For example, the kit could include multiple soft beads each of a different size, shape, contour, color, texture, etc. and a single bead sleeve. The kit can also include multiples of the same soft bead or could include one stop or multiple stops. Any suitable combination can be included in the kit.

The soft beads of the disclosed fishing lure systems in this application can be manufactured in several ways. For example, the soft beads can be made using an injection molding process that includes a mold having a soft bead body cavity and one or more wire cavities. To create a pre-formed hole through the soft bead, the injection molding process can use a lubricious surface, like an electropolished stainless steel wire such as a Kirschner wire used in medical applications, which is held in place using the wire cavities. The lubricious wire is suspended through the soft bead cavity. When the thermoplastic is poured into the soft bead cavit(ies) of the mold, the wire extends through the thermoplastic. Once the soft bead is finished curing in the mold, it is removed from the mold and the lubricious wire is removed from the hole, which produces a soft bead with a hole that is pre-formed for an angler's use.

The features disclosed in the foregoing description, or the following claims, or the accompanying drawings, expressed in their specific forms or in terms of a means for performing the disclosed function, or a method or process for attaining the disclosed result, as appropriate, may, separately, or in any combination of such features, be used for realizing the invention in diverse forms thereof.

What is claimed is:

1. A fishing lure system, comprising:
   a bead comprising:
   a pliable body, and
   a pre-formed hole extending through a central portion of the pliable body, the pre-formed hole being expandable from a first diameter to a second diameter when a sleeve is inserted in or through the pre-formed hole;
   the sleeve comprising:
   a main body having a diameter greater than the first diameter of the pre-formed hole, and
   a hollow interior extending through the main body, the hollow interior being expandable from a first diameter to a second diameter when a bead stop is inserted in or through the hollow interior; and
   the bead stop comprising:
   a flared end,
   a post extending outwardly from the flared end, the post having a diameter greater than the first diameter of the hollow interior of the sleeve, and
   a stop hole extending through the post and flared end.

2. The fishing lure system of claim 1, wherein the pliable body is spherical or fish-egg shaped.

3. The fishing lure system of claim 1, wherein the pliable body has a convex outer surface, and wherein the flared end is concave.

4. The fishing lure system of claim 1, wherein the sleeve has at least one end with a radially extending protrusion.

5. The fishing lure system of claim 4, wherein both ends of the sleeve have radially extending protrusions.

6. The fishing lure system of claim 1, wherein the pre-formed hole and the sleeve have a mating cylindrical shape.

7. The fishing lure system of claim 1, wherein the flared end includes a diameter greater than the first or second diameters of the hollow interior of the sleeve and the first or second diameters of the hole of the pliable body.

8. The fishing lure system of claim 1, wherein an outer diameter of the sleeve is greater than the first diameter of the hole of the bead.

9. The fishing lure system of claim 8, wherein at least a portion of the sleeve is located within the hole of the bead.

10. The fishing lure system of claim 9, wherein the sleeve has a length greater than a length of the hole of the pliable body.

11. The fishing lure system of claim 9, wherein an outer diameter of the post is greater than the first diameter of the hollow interior of the sleeve.

12. The fishing lure system of claim 11, wherein at least a portion of the post of the bead stop is located within the hollow interior of the sleeve.

13. The fishing lure system of claim 12, wherein a friction force is formed between the portion of the sleeve located within the hole of the bead and the hole of the bead.

14. The fishing lure system of claim 13, wherein a friction force is formed between the portion of the post of the bead stop located within the hollow interior of the sleeve and the hollow interior of the sleeve.

15. The fishing lure system of claim 12, wherein the bead, the sleeve, and the bead stop are coaxial.

16. The fishing lure system of claim 12, further comprising the fishing line extending through the stop hole of the bead stop.

17. The fishing lure system of claim 16, wherein an outer diameter of the fishing line is greater than an internal diameter of the stop hole of the bead stop.

18. The fishing lure system of claim 17, wherein a friction force is formed between the fishing line and the stop hole of the bead stop.

19. The fishing lure system of claim 16, further comprising a hook attached to one end of the fishing line.

\* \* \* \* \*